United States Patent [19]
Smith et al.

[11] Patent Number: 5,981,105
[45] Date of Patent: Nov. 9, 1999

[54] HIGH RATE METAL OXIDE ELECTRODES

[75] Inventors: David F. Smith, Boulder Creek; George R. Graybill, Santa Cruz, both of Calif.

[73] Assignee: EMF Systems, Inc., Boulder Creek, Calif.

[21] Appl. No.: 08/884,783

[22] Filed: Jun. 30, 1997

Related U.S. Application Data

[60] Provisional application No. 60/021,384, Jul. 8, 1996, and provisional application No. 60/021,552, Jul. 11, 1996.

[51] Int. Cl.$^6$ ...................................................... H01M 4/34
[52] U.S. Cl. ............................ 429/219; 429/220; 429/206
[58] Field of Search ..................................... 429/219, 217, 429/220, 206

[56] References Cited

U.S. PATENT DOCUMENTS

| | | | |
|---|---|---|---|
| 4,056,664 | 11/1977 | Jaffe | 429/217 |
| 4,139,683 | 2/1979 | Sauer | 429/219 |
| 4,146,685 | 3/1979 | Tucholski | 429/217 |
| 4,172,927 | 10/1979 | Toyoguchi et al. | 492/194 |
| 4,612,213 | 9/1986 | Meunier | 427/126.6 |

FOREIGN PATENT DOCUMENTS

| | | |
|---|---|---|
| 52-053223 | 4/1977 | Japan . |
| 59-099660 | 6/1984 | Japan . |

OTHER PUBLICATIONS

CA registry number 1301–96–8 "Silver monoxide" (no month available), 1998.

CA registry number 20667–12–3 "Disilver oxide"(no month available), 1998.

Smith, et al., "New Developments in very high rate silver oxide electrode", J. Power Sources, vol. 65, pp. 47–52, Mar. 4, 1997

*Primary Examiner*—Maria Nuzzolillo
*Assistant Examiner*—Carol Chaney

[57] ABSTRACT

A metal oxide electrode which uses no additives and only a small amount of a non-film forming binder are capable of discharging at very high current density with near complete utilization of the active material. Oxides of silver and copper are used because the reaction products are more conductive than the conductivity of the reactants.

8 Claims, No Drawings

HIGH RATE METAL OXIDE ELECTRODES

This applications claims no benefit of priority of Provisional application Nos. 60/021,384 filed Jul. 8, 1996 and 60/021,552 filed Jul. 11, 1996.

BACKGROUND OF THE INVENTION

1. Field of the Invention

This invention relates to a positive electrode for electrochemical cells and more particularly to a metal oxide electrode which can discharge at a high rate of discharge in primary batteries made of such cells.

Reserve type batteries are one type of primary battery which generally must discharge at high rate; where the energy of the battery is completely removed over a period of only minutes. Divalent metal oxide depolarizers such as silver (II) oxide (AgO) are used in such batteries. The monovalent form of silver oxide, however, is not useable in such applications because of its very high resistivity ($10^8$ $\Omega$-cm), even though it has superior stability compared to the divalent oxide. The divalent oxide, however, is more generally used and has a lower resistivity of $10^{-60}$ $\Omega$-cm but it loses half of its capacity by decomposition to silver monoxide by the reaction:

The most generally used silver oxide electrodes are those which are produced by the anodization of porous silver metal in alkali. The electrodes are electronically conductive. A typical example of this class of electrodes is described in U.S. Pat. No. 2,615,930 to Moulton. Plates were made of porous silver by a sintering process. Several other patents including the porous silver electrode patented by Jungner in 1899 (*Zinc-Silver Oxide Batteries*, John Wiley & Sons, New York, 1971, p.199) and (U.S. Pat. No. 3,002,834 to DiPasquale) describe other methods of producing the sintered silver, but all rely on anodization processes to convert the porous silver to silver oxides.

The sintered electrodes are anodized in alkali for several hours to convert the silver metal powder they contain to the higher valence oxides. It is now well known to those skilled in the art that the anodizing process is only partly efficient and a mixture of silver metal, silver (II) oxide (AgO), and silver (I) oxide ($Ag_2O$) is the result of the process. Typically, the amount of AgO thus formed is at best about 85% of the theoretical conversion of the silver metal to the oxide.

A major problem with the process is the fact that the capacity of the electrodes is not consistant in this batch type anodizing method, due to the inevitable variations in current distribution inherent in the process. Additionally, the actual composition of the electrodes cannot be determined directly in a practical, non-destructive manner. Compounding the problems is the previously described fundamental instability of the AgO and the reaction which occurs between the AgO and the unconverted silver metal in the electrode:

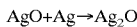

Several workers have recognized the problems which are caused by the mixed chemistry of the electrodes. Pure, chemically prepared silver (II) oxide (AgO) has been used by Coleman and King (*Power Sources Vol.* 1, Pergamon Press, 1967, p.193) who added several percent of carbon in various forms along with other binders, which included methyl cellulose and polyvinyl alcohol. The carbon was added to increase the mechanical strength of the electrodes. The utilization of the active material was about 75–80% at best.

The use of the chemically prepared silver (I) oxide ($Ag_2O$) is limited to lower rate applications such as powering watches and hearing aids. The energy of the cells is drained over several days. Even for such low rate applications, conductive additives such as graphite have been added to the oxide to mitigate its high electrical resistance, as described by Passaniti and Megahed (*Handbook of Batteries*, McGraw-Hill, New York, 2nd Edition, 1995, p.12.1).

In U.S. Pat. No. 4,172,183 to Ruetschi, graphite or silver powder was added to chemically prepared silver (I) oxide ($Ag_2O$) or mercuric oxide, functioning as a conductive additive.

In U.S. Pat. No. 4,187,328 to Jumel, silver (II) oxide (AgO) was reduced with hydrazine, which left a coating of silver metal on the surface of the depolarizer particles. The silver coating had several attributes, one of which was the provision of increased electronic conductivity to the electrode. A cell built according to their invention delivered only 74.9% of its theoretical capacity at a low rate of discharge of about 8 ma/cm$^2$.

U.S. Pat. No. 4,146,685 to Tucholski taught the use of a hydrophillic binder in molded depolarizer tablets, which are pressed into metal containments which act as current collectors. The molded tablets are used in very low rate cells such as those used for watches and hearing aids. The binder had a dual function of a lubricant and a binder, replacing the prior art graphite, which provided the same functions. The electrodes were for use at extremely low rate, but even low rate pulse performance for only 2 seconds at 30 and 100 ohms was inferior to the prior art, using graphite as the additive.

In U.S. Pat. No. 5,580,683 to Takeuchi and Marilla, carbon or graphite and mixtures thereof were used in their preferred embodiment of mixed metal oxide electrodes comprised of silver vanadium oxide, along with a polymeric binder.

All of the referenced prior art which relies on the use of electronically conductive additives or other methods to improve the electronic conductivity of electrodes decrease the energy density of the electrodes, partly because the additives do not take part in the discharge reaction. We believe that they also decrease performance at higher discharge rates because they tend to physically block the active depolarizer from the current collector.

The prior art, which uses types of carbon, which are less electronically conductive than graphite or metal powders, to increase the physical strength of electrodes, similarly decreases energy density because they do not take part in the discharge process and block the active material from the current collector.

2. Summary of the Prior Art

The prior art generally teaches the use of electronically conductive additives to metal oxide electrodes, even for low rate applications. The additives increase the conductivity or the physical strength of such electrodes.

For batteries which must operate at much greater current density, silver (II) oxide (AgO) is used rather than the more stable silver (I) oxide ($Ag_2O$) mainly because of its higher conductivity and its initially greater energy content.

The silver (I) oxide ($Ag_2O$) is used only with additives which increase the electronic conductivity of the electrodes or increase their strength, and even then they are generally used only for low drain rate applications at current densities of less than a few milliamperes per square centimeter.

SUMMARY OF THE INVENTION

Contrary to the teaching of the prior art, we have discovered that electrodes made with $Ag_2O$ by itself, with no additives to reduce the electronic resistance or to increase their strength, surprisingly operate with near full utilization even at extremely high rates of discharge.

Counterintuitively, the electrodes of the invention operate efficiently at extremely high rate because of the high resistivity of the monovalent or divalent depolarizer. The discharge reaction is thus forced to occur at the interface between the active material and the current collecting substrate of the electrode. The product of the discharge (reduction) reaction is a continuously growing, highly conducting mass of metal.

The additives such as graphite, carbon, metal powder, etc., which are typical of the prior art only tend to block the efficient discharge reaction.

We have also used very small amounts of binder to minimize the blocking due to the binder.

ADVANTAGES OF THE INVENTION

Several advantages of the invention are:

(1) It provides electrodes which are made with the stable metal oxide depolarizers such as silver (I) oxide ($Ag_2O$), which can now discharge at very high rate and with near complete utilization of the active material.

(2) The capacity of such electrodes can easily be calculated directly from the weight of the electrode active material alone. The knowledge of the capacity is essential in the design of reliable batteries.

(3) For electrodes using monovalent metal oxides such as silver (I) oxide ($Ag_2O$) as depolarizer, the capacity of the electrodes after extended periods of storage can be predicted with accuracy.

(4) It provides electrodes which are less costly because the capacity can be easily calculated. There is no need for the expensive quality assurance testing which is a requirement with electrodes of the prior art.

(5) It provides electrodes which are less costly because the water based process does not produce soluble heavy metal compounds which endanger the environment and are expensive to control.

DETAILED DESCRIPTION OF THE INVENTION

The preferred embodiment of the invention is described in Example 1.

EXAMPLE 1

Silver (I) oxide powder is mixed with a binder material to add strength to the finished electrode. A small amount of the binder is preferred, to minimize blocking of the active material of the electrode from the current collector. The preferred binder is a dispersion of flourocarbon resin, in this case polytetrafluoroethylene (PTFE) in water. The material is available from several sources. In the example, Teflon T-30, a product of DuPont was used. The T-30 is a 60% solids dispersion of PTFE in water.

Fifty(50) ml of de-ionized water was added to 20 grams of silver (I) oxide ($Ag_2O$) powder, to which was added 6 ml of a mixture of 1 ml of T-30 dispersion in 100 ml of deionized water.

The silver (I) oxide ($Ag_2O$) powder has a nominal particle size of about 4 microns. The material used is a product of Ames-Goldsmith Corporation in Glens Falls, N.Y.

The silver (I) oxide, PTFE, and water mixture was shaken vigorously for one minute, then was filtered and dried for one hour at 100° C. The dried powder was then sieved through a 20 mesh screen to break up any agglomerates. The amount of PTFE by weight in the dry mix was thus approximately 0.25%.

The dry powder mix was then spread evenly over a 2.5 cm×2.5 cm area of a 2.5×7.5 cm piece of expanded silver metal current collector. The material used is designated 5Ag5 4/0, marketed by Exmet Corporation, Naugatuck, Conn., but other materials with a different composition or pattern can be used.

The loading for the active material mix was 46.3 mg/cm$^2$ over the 2.5×2.5 cm active area of the electrode. The electrode was then pressed to a final thickness of 0.185 mm. The porosity of the final electrode was 58%.

The electrode was discharged in a test cell, the construction of which are well known to workers skilled in the art. In the test, the voltage of the silver (I) oxide electrode was measured versus a zinc reference electrode while it was discharged against a counterelectrode at a constant current at a very high rate of discharge (500 ma/cm$^2$). The test was conducted at a temperature of 25° C. The electrolyte was 28% by weight of potassium hydroxide in water.

The electrode discharged for sixty-three(63) seconds before the voltage dropped below 1.0 volts. The utilization of the active material was 82% of the theoretical value of 0.231 Ah/gram. The average voltage during the discharge was 1.44 volts.

For comparison purposes, a silver (II) oxide (AgO) electrode was prepared by the same method, where the mix loading was 61.7 mg/cm$^2$ and the final thickness was 0.198 mm. The electrode was also discharged at 500 ma/cm$^2$ under the identical conditions. The electrode discharged for 174 seconds before the voltage dropped below 1.0 volt, or a utilization of 91% of the theoretical. The average voltage was 1.51 volts.

The silver (I) oxide electrode was shown to deliver surprisingly high utilization and voltage at the high current density, as did the silver (II) oxide electrode. The capacity of the silver (II) oxide electrode, however, will decrease eventually by roughly one-half as a consequence of the decomposition of AgO to $Ag_2O$.

EXAMPLE 2

An electrode was made by the same method but used a total of 2.5% by weight of the PTFE binder. The electrode active material loading of $Ag_2O$ was 57.2 mg/cm2 and the finished thickness of the electrode was 0.17 mm. The porosity was 45%.

The electrode was discharged as in the previous test, but the current was significantly decreased, to a current density of 80 ma/cm2. The electrode discharged for 550 seconds before it dropped below 1.0 volts. The utilization of the active material was 95% of the theoretical value. The average voltage was 1.51 volts.

EXAMPLE 3

An electrode was made with a coagulated dispersion form of polytetrafluoroethylene (PTFE) binder, which is available from several sources. The material used in this example is available from DuPont de Nemours,E.I. & Co.,Inc. in Wilmington, Del., as Teflon T6C powder. Coagulated dispersion powder is not miscible with water. Accordingly, 700 ml of mineral spirits was added to 50 grams of silver (I) oxide ($Ag_2O$) powder as used in the previous examples. The mineral spirits used in the example is known as Stoddard Solvent, but other types can be used.

Teflon T6C was added in an amount equal to 1.00 weight percent of the dry silver (I)oxide. The mixture was then blended in a high speed mixer for two minutes. In the example a simple kitchen blender was used, but other types of mixers can be used. The blended material was then filtered to remove most of the mineral spirits.

The still moist powder mix was then applied with a blade in a smearing motion to a current collector identical to that used in the previous Examples 1 and 2, using shims to set the thickness at 0.25 mm. The electrode was then dried and rolled to a final thickness of 0.21 mm. The loading of the mix onto the active portion (2.5×2.5cm) of the electrode was 68.8 mg/cm$^2$. The porosity of the final electrode active material was 34%.

The electrode was discharged as in the previous examples, but at a temperature of 7° C. and at a current density of 120 ma/cm$^2$. The electrode discharged for 522 seconds before the voltage dropped below 1.00 volts, which is equal to 90% of the theoretical utilization of the silver (I) oxide powder. The average voltage was 1.42 volts.

EXAMPLE 4

An electrode was made with silver (I) oxide powder, as in the previous examples. Coagulated dispersion (Teflon T6C powder) was used as a binder, with the amount being equal to 1.75% of the weight of the silver (I)oxide powder, by weight Mineral spirits known as Stoddard Solvent and the silver (I) oxide powder were used in the identical amount as previously described in EXAMPLE 3.

After blending and filtering, the moist powder mixture was rolled to a thickness of 1.5 mm with a common kitchen rolling pin. The mineral spirits were then allowed to evaporate for sixteen hours. Two pieces of the rolled material, sized 0.35×0.50 cm, were cut from the rolled sheet and then pressed, one on each side, onto a current collector of the identical expanded silver used in EXAMPLES 1, 2, and 3. The final thickness of the electrode after pressing was 1.4 mm.

The electrode was then discharged in the identical manner as described in EXAMPLES 1, 2, and 3, at a temperature of 20° C. and a current density of 80 ma/cm$^2$. The utilization of the silver (I) oxide powder active material was 85% of the theoretical value, and the average voltage was 1.25 volts.

EXAMPLE 5

An electrode was made by the same method as EXAMPLE 1 with a current collector of reticulated metal foam. Fifty(50) ml of de-ionized water was added to 20 grams of silver (I) oxide powder, to which was added 6 ml of a mixture of 1 ml of DuPont T-30 PTFE dispersion in 100 ml of de-ionized water. The silver (I) oxide, PTFE, and water mixture was shaken vigorously for one minute, followed by filtering and drying at 100° C. for one hour. The dried powder was then sieved through a 20 mesh screen.

The powder was then wet with de-ionized water to obtain a moderately fluid paste. The amount of water is not critical, but the paste must be fluid enough to readily fill the pores in the foam substrate, but not so fluid as to flow through the foam.

The paste was then spread evenly with a thin metal blade over a 2.5 cm×2.5 cm area of a 2.5 cm×7.5 cm current collector of copper metal foam. In this example, the paste was applied to fill the pores of the copper foam, without leaving any active mix covering the surfaces of the foam.

The thickness of the foam was 0.8 mm. The metal foam was obtained from Precious Plate, Inc., Niagara Falls, N.Y., but is available from several other sources.

The pasted electrode was then dried in a convection oven at 60° C. before it was compressed to final thickness by rolling between rollers with a 1:1 speed ratio. In that way no shear was applied to the electrode during compression. The final mix loading was 77.5 mg/cm$^2$ of the electrode surface for the 2.5 cm×2.5 cm active portion of the electrode. The final thickness was 0.203 mm.

The electrode was then discharged in the test cell and electrolyte solution described in the previous examples. The 5.0 cm long area of the electrode which contained no silver (I) oxide and PTFE mix was used as the electrode tab for the discharge test.

The electrode was discharged at a current density of 1,000 ma/cm$^2$ at a temperature of 20° C. The electrode discharged above 1.0 volts for 50 seconds, or 77% of the theoretical utilization based upon the actual weight of silver (I)oxide ($Ag_2O$) in the electrode. The average voltage was 1.323 volts.

SUMMARY, RAMIFICATIONS, AND SCOPE

Accordingly, the reader will see that the prior art teaches away from the invention, in that conductive additives are added to the depolarizer powder to reduce the high electronic resistance of electrodes or to increase the physical strength of electrodes which are made with the material. The additives are used even for very low discharge rate applications such as batteries for watches and hearing aids.

The invention, however, is based upon the recognition that the high electronic resistance of the depolarizer metal oxide is in fact beneficial and forces the discharge reaction to initially occur and proceed uniformly from the interface of the depolarizer with the current collecting substrate of electrode. For metal oxide depolarizers such as the group consisting of silver (I) and copper (I) oxides, the reduction reaction proceeds with a growing interface of conductive reduced metal, since the product of the discharge reaction of the metal oxide is base metal. Other metal oxides can be used provided that the electronic conductivity of the product of the reduction reaction is greater than the electronic conductivity of the reactants.

Any materials or processes which block or impede the interface of the depolarizer and current collecting substrate will actually decrease the efficiency of the electrode. For that reason, small amounts of binders which do not form films are to be preferred, such as polytetraflouroethylene, and other flourocarbon polymers and copolymers.

Although the description of the invention contains seven detailed examples, these should not be construed as limiting the scope of the invention but as merely providing illustrations of some of the presently preferred embodiments of the invention. For example, other types of non-film forming binders can be used, the electrodes can be pressed to other thicknesses to attain different porosities, different electroactive materials can be used where the discharge product is significantly more conductive than the reactants, different blending fluids other than water or mineral spirits can be used, other types of electrode current collectors such as perforated foil or electronically conductive fiber mats can be used, etc.

Thus the scope of the invention should be determined by the appended claims and their legal equivalents, rather than by the examples which have been presented.

We claim:

1. An electrode for use in inorganic alkaline electrolyte electrochemical calls consisting essentially as an active material, a monovalent metal oxide depolarizer, a current collector, and a binder, the improvement wherein said electrode contains no added electronically conductive or semiconductive additives.

2. An electrode for use in inorganic electrolyte electrochemical cells according to claim 1 wherein the monovalent metal oxide depolarizer is silver (I) oxide ($Ag_2O$).

3. An electrode for use in inorganic electrolyte electrochemical cells according to claim 1 wherein the monovalent metal oxide depolarizer is copper (I) oxide ($Cu_2O$).

4. An electrode for use in inorganic electrolyte electrochemical cells according to claim 1 wherein the current collector is expanded foil selected from the group consisting of silver, copper, or nickel.

5. An electrode for use in inorganic electrolyte electrochemical cells according to claim 1 wherein the current collector is reticulated foam selected from the group consisting of silver, copper, and nickel.

6. An electrode for use in inorganic electrolyte electrochemical cells according to claim 1 wherein said current collector is perforated foil selected from the group consisting of silver, copper, and nickel.

7. An electrode for use in inorganic electrolyte electrochemical cells according to claim 1 wherein said current collector is metal in fiber form selected from the group silver, copper, and nickel.

8. An electrode for use in inorganic electrolyte electrochemical cells according to claim 1 wherein said binder is selected from the group of polymers and copolymers containing flourine, in an amount between 0.1 and 2.5 percent of the weight of the monovalent metal oxide.

* * * * *

UNITED STATES PATENT AND TRADEMARK OFFICE
CERTIFICATE OF CORRECTION

PATENT NO.  : 5,981,105
DATED       : Nov. 9, 1999
INVENTOR(S) : David F. Smith, George R. Graybill It is certified that error appears in the above-identified patent and that said Letters Patent is hereby corrected as shown below:

Column 1, line 7, add the following:

Part of this invention was made with Government support in accordance with contract N00164-95-C-0119 awarded by the U.S.Navy. The Government has certain rights limited to claim 17.--

Signed and Sealed this

Twenty-third Day of May, 2000

Attest:

Q. TODD DICKINSON

Attesting Officer

Director of Patents and Trademarks